United States Patent
Oh et al.

(10) Patent No.: US 7,408,020 B2
(45) Date of Patent: Aug. 5, 2008

(54) COMPOSITION FOR LC ALIGNMENT FILM USING DIAMINE HAVING DENDRON SIDE CHAIN

(75) Inventors: Jae Min Oh, Gyeonggi-Do (KR); O Bum Kwon, Seoul (KR); Won Seok Dong, Gyeonggi-Do (KR); Bum Jin Lee, Gyeonggi-Do (KR); Jong Seob Kim, Daejeon-Si (KR)

(73) Assignee: Cheil Industries Inc., Gyeongsangbuk-Do (KR)

( * ) Notice: Subject to any disclaimer, the term of this patent is extended or adjusted under 35 U.S.C. 154(b) by 433 days.

(21) Appl. No.: 11/219,046

(22) Filed: Sep. 1, 2005

(65) Prior Publication Data

US 2006/0147651 A1    Jul. 6, 2006

(30) Foreign Application Priority Data

Dec. 31, 2004    (KR) .................. 10-2004-0118125

(51) Int. Cl.
*C08G 73/06* (2006.01)
*C08G 69/08* (2006.01)
*B32B 27/00* (2006.01)
*C09K 19/00* (2006.01)

(52) U.S. Cl. .................. 528/424; 528/422; 528/310; 428/1.1

(58) Field of Classification Search .................. 528/424, 528/422, 310, 428, 1.1
See application file for complete search history.

(56) References Cited

U.S. PATENT DOCUMENTS 5,420,233 A     5/1995   Isogai et al.
7,307,139 B2 *  12/2007  Oh et al. .................. 528/310

FOREIGN PATENT DOCUMENTS

JP    6-136122    5/1994
JP    11-84391    3/1999

\* cited by examiner

*Primary Examiner*—Duc Truong
(74) *Attorney, Agent, or Firm*—Jordan and Hamburg LLP (57) ABSTRACT

Disclosed herein is an LC aligning agent using diamine having dendron side chains. In detail, the present invention relates to a composition for an LC alignment film which employs diamine having dendron side chains to produce polyamic acid, followed by imidization. When the LC alignment film is applied to a liquid crystal display device, high heat resistance, high penetration in a visible ray range, excellent alignment, and a high voltage holding ratio are assured. Even though it contains a small amount of functional diamine, a high pretilt angle can be assured. Thus, the pretilt angle is easily controlled and a vertical aligning force is improved.

10 Claims, 1 Drawing Sheet

COMPOSITION FOR LC ALIGNMENT FILM USING DIAMINE HAVING DENDRON SIDE CHAIN

BACKGROUND OF THE INVENTION

1. Field of the Invention

The present invention relates to an LC (liquid crystal) aligning agent using diamine having dendron side chains. More particularly, the present invention relates to a composition for an LC alignment film which employs diamine having dendron side chains to produce polyamic acid, followed by imidization. When the LC alignment film is applied to a liquid crystal display device, high heat resistance, high penetration in a visible ray range, excellent alignment, and a high voltage holding ratio are assured. Particularly, even though it contains a small amount of functional diamine, a high pretilt angle can be assured, thus providing easy control of the pretilt angle and improving a vertical aligning force.

2. Description of the Related Art

A liquid crystal display device is operated using the property in which the arrangement of liquid crystal changes depending on the application of external voltage due to the effect of an electric field and external light incident on the LCD is blocked or passed therethrough due to the change in arrangement. Functions of the LCD, such as light penetration, a response rate, a visual angle, and a contrast ratio, depend on the arrangement of liquid crystal molecules. Accordingly, it is very important to uniformly control the arrangement of the liquid crystal molecules.

The demand for high quality displays is continuously growing in accordance with the recent growth of an LCD market, and the demand for an alignment film having high productivity is growing as the trend toward a large area is rapidly increasing in the fabrication of the LCD. Hence, there is a need to develop an alignment film having various excellent properties, such as low defective fractions, excellent electrooptical properties, and high reliability, in a process of fabricating the LCD. That is to say, there is a need for an LC alignment film which has excellent printability, a stable pretilt angle, high voltage holding ratio, and sufficiently small voltage accumulation due to a direct current, and which is capable of being reworked.

The LC alignment film is a polymer substance which is formed between a transparent conductive film, such as indium tin oxide (ITO), and liquid crystals to achieve the uniform arrangement of liquid crystal molecules, that is, alignment, and is used as means for controlling the liquid crystals using a mechanical method, such as rubbing, or other methods.

In a conventional process of uniformly arranging, that is, aligning, the liquid crystals in the LCD, which is called a rubbing process, polymer, such as polyimide, is applied on a transparent conductive glass to form a polymer film, and the alignment film is rubbed using a roller which is wound by a rubbing cloth, such as nylon or rayon, and which rotates at a high rate to achieve alignment. Through the rubbing process, the liquid crystal molecules are aligned at a predetermined pretilt angle on a surface of the alignment film.

A conventional polyimide resin for an LC alignment film is produced by polycondensating monomers which are exemplified by aromatic acid dianhydride, such as pyromellitic dianhydride (PMDA) or biphthalic dianhydride (BPDA), and aromatic diamine, such as p-phenylene diamine (p-PDA), m-phenylene diamine (m-PDA), 4,4-methylene dianiline (MDA), 2,2-bis(aminophenyl)hexafluoropropane (HFDA), m-bis(aminophenoxy)diphenylsulfone (m-BAPS), p-bis(aminophenoxy)diphenylsulfone (p-BAPS), 4,4-bis(aminophenoxy)phenylpropane (BAPP), or 4,4-bis(aminophenoxy)phenylhexafluoropropane (HF-BAPP).

However, if only aromatic acid dianhydride and diamine are used as described above, thermal stability, resistance to chemicals, and mechanical properties are excellent, but, disadvantageously, transparency and solubility are reduced due to a charge transfer complex, and electrooptical characteristics are worsened. Effort has been made to avoid the disadvantages using an aliphatic cyclic acid dianhydride monomer or aliphatic cyclic diamine (Japanese Patent Laid-Open Publication No. 11-84391). Additionally, the use of a functional diamine having side chains or functional acid dianhydride having side chains has been introduced to increase the pretilt angle of liquid crystals and achieve stability (Japanese Patent Laid-Open Publication No. 06-136122). Furthermore, effort has been made to develop a vertical alignment film capable of being used in a vertically aligned mode (VA mode) in which liquid crystals are aligned perpendicular to a surface in the course of forming an LCD panel (U.S. Pat. No. 5,420,233).

However, the demand for high quality displays continuously grows in accordance with the recent growth of the LCD market, and the demand for an alignment film having high productivity grows as the trend toward a large area is rapidly increasing in the fabrication of the LCD. Hence, there is increased need to develop a high performance LC alignment film which has low defective fractions, excellent electrooptical properties, and high reliability, and is capable of meeting various requirements of the LCD in a process of fabricating the LCD.

SUMMARY OF THE INVENTION

Accordingly, the present invention has been made keeping in mind the above problems occurring in the prior art, and an object of the present invention is to provide a composition for an LC alignment film, which employs a diamine compound having dendron side chains. The composition is capable of being used to control a pretilt angle within a range of 1-90°, and has improved stability and resistance to chemicals in a washing process, excellent alignment and electrooptical properties, and superior printability and processability.

According to an aspect of the present invention, in order to accomplish the above object, the present invention relates to a novel diamine compound having a dendron side chain.

According to another aspect of the present invention, in order to accomplish the above object, the present invention relates to a composition for a liquid crystal alignment film. The composition comprises polyamic acid which is produced by copolymerizing the diamine compound, aliphatic cyclic acid dianhydride, aromatic cyclic acid dianhydride, and optionally an aromatic cyclic diamine compound.

According to another aspect of the present invention, in order to accomplish the above object, the present invention relates to an LC alignment film for twisted nematic (TN) or vertical alignment (VA) application. The LC alignment film is produced by applying the composition for the liquid crystal alignment film and totally or partially imidizing the applied composition.

According to another aspect of the present invention, in order to accomplish the above object, the present invention relates to an LCD including the LC alignment film.

BRIEF DESCRIPTION OF THE DRAWINGS

The above and other objects, features and advantages of the present invention will be more clearly understood from the

DESCRIPTION OF THE PREFERRED EMBODIMENTS

Hereinafter, a detailed description will be given of the present invention, referring to the accompanying drawings.

A diamine compound which has dendron side chains and is newly provided in the present invention is expressed by the following Formula 1.

Formula 1 wherein, A and A' are each a single bond, —CH$_2$O—, OCH$_2$—, —OCO—, or —NHCO—, B is —O— or a single bond, m is an integer of 1 to 3, n is an integer of 2 or 3, G is a single bond (when m is 1), a benzene ring having an equivalence of 3 when m is 2), or a benzene ring having an equivalence of 4 when m is 3), and R is each independently a linear, branched, or cyclic alkyl or fluoroalkyl group having 1 to 30 carbons.

Examples of the diamine compound having the dendron structure include 16G1-AG-bis(aminophenoxy)triazine expressed by the following Formula 2 or 16G2-AG-bis(aminophenoxy)triazine expressed by the following Formula 3.

Formula 2

-continued

Formula 3

Since the diamine compound having the dendron structure according to the present invention has excellent LC alignment efficiency, it is possible to assure a high pretilt angle even if it is used in a small amount. It also has excellent alignment stability and optical properties, thus it is capable of being usefully used as the composition for the LC alignment film as described later.

The content of functional diamine is 0.1-100 mol %, preferably 0.5-30 mol %, and more preferably 1-20 mol %, based on total diamine monomers.

In the present invention, the diamine compound reacts with aliphatic cyclic acid dianhydride, aromatic cyclic acid dianhydride, and optionally an aromatic cyclic diamine compound to produce polyamic acid, and polyamic acid is dissolved in an appropriate solvent, thereby providing the composition for the LC alignment film.

In the composition, it is preferable that the polyamic acid content be 1-40 wt % and the solvent content be 60-99%, so as to accomplish the effects of the present invention.

Polyamic acid of the present invention, which is produced using the diamine compound of the above-mentioned Formula 1, is generally expressed by the following Formula 4.

Formula 4 wherein, X and Y are each independently acid dianhydride and one or more functional groups selected from functional groups expressed by the following Formula 5 or 6, Z includes one or more functional groups selected from functional groups expressed by the following Formula 7, Z' includes one or more functional groups selected from functional groups expressed by the following Formulae 1a and 7, and at least one Z' of polyamic acid monomer expressed by Formula 4 is selected from functional groups expressed by the following Formula 1a.

Formula 1a wherein, A and A' are each a single bond, —CH$_2$O—, OCH$_2$—, —OCO—, or —NHCO—, B is —O— or a single bond, m is an integer from 1 to 3, n is an integer of 2 or 3, G is a single bond (when m is 1), a benzene ring having an equivalence of 3 when m is 2), or a benzene ring having an equivalence of 4 when m is 3), and R is each independently a linear, branched, or cyclic alkyl or fluoroalkyl group having 1 to 30 carbons.

Formula 5

Formula 6 wherein, X$_1$, X$_2$, X$_3$, and X$_4$ are each independently —H, —CH$_3$, —F, —Br, —Cl, —CN, —OH, or —NO$_2$.

Formula 7

-continued

As described above, polyamic acid expressed by Formula 4 is produced by copolymerizing the diamine compound of Formula 1, aliphatic cyclic acid dianhydride, aromatic cyclic acid dianhydride, and optionally the aromatic cyclic diamine compound.

The diamine compound having dendron side chains is used in a content of 0.1-100 mol %, and preferably 1-20 mol %, based on total diamine monomers. It is preferable to use aromatic cyclic acid dianhydride in a content of 10-100 mol % based on total acid dianhydride monomers, and it is preferable that an equivalent ratio of diamine monomer to acid dianhydride monomer be 95-105%.

It is possible to control a pretilt angle within a desired range by adjusting the content of diamine having dendron side chains during the production of polyamic acid, and aromatic cyclic diamine may selectively be added depending on a mode of LCD during polymerization of polyamic acid.

Illustrative, but non-limiting examples of aromatic cyclic diamine which are capable of being used in the production of polyamic acid according to the present invention include p-phenylene diamine (p-PDA), 4,4-methylene dianiline (MDA), 4,4-oxydianiline (ODA), m-bis(aminophenoxy)diphenylsulfone (m-BAPS), p-bis(aminophenoxy)diphenylsulfone (p-BAPS), 2,2-bis(aminophenoxy)phenylpropane (BAPP), and 2,2-bis(aminophenoxy)phenylhexafluoropropane (HF-BAPP).

Illustrative, but non-limiting examples of aromatic cyclic acid dianhydride which are capable of being used in the production of polyamic acid according to the present invention include pyromellitic dianhydride (PMDA), biphthalic dianhydride (BPDA), oxydiphthalic dianhydride (ODPA), benzophenonetetracarboxylic dianhydride (BTDA), and hexafluoroisopropylidene diphthalic dianhydride (6-FDA). Polyamic acid produced employing them enables the alignment film formed in a thickness of 0.1 μm or so to be capable of enduring a rubbing process which unidirectionally aligns liquid crystals, and to have desired heat resistance in a high temperature process at 200° C. or higher and excellent resistance to chemicals.

Aliphatic cyclic acid dianhydride used to produce polyamic acid of the present invention helps avoid problems of insolubility in a typical organic solvent, low penetration in a visible ray range due to a charge transfer complex, and deterioration of electrooptical properties due to the high polarity of a molecular structure.

It is preferable that the content of aliphatic cyclic acid dianhydride be 20-90 mol % based on total acid dianhydride.

Illustrative, but non-limiting examples of preferable aliphatic cyclic acid dianhydride include 5-(2,5-dioxotetrahydrofuran-3-yl)-1,2,3,4-tetrahydronaphthalene-1,2-dicarboxylic anhydride (DOTDA), 5-(2,5-dioxotetrahydrofuryl)-3-methyl-3-cyclohexene-1,2-dicarboxylic anhydride (DOCDA), bicycloocten-2,3,5,6-tetracarboxylic dianhydride (BODA), 1,2,3,4-cyclobutanetetracarboxylic dianhydride (CBDA), 1,2,3,4-cyclopentanetetracarboxylic dianhydride (CPDA), and 1,2,4,5-cyclohexanetetracarboxylic dianhydride (CHDA).

Meanwhile, a polysiloxane-based diamine compound expressed by the following Formula 8 may be further added as the diamine compound used to produce polyamic acid of the present invention.

Formula 8 wherein, $R_1$, $R_2$, $R_3$, and $R_4$ are each independently alkyl, alkoxy, or aryl groups having 1 to 10 carbons, $R_5$ and $R_6$ are each independently alkylene groups having 1 to 10 carbons, and k is an integer from 1 to 10.

It is preferable that a number average molecular weight of polyamic acid of the present invention be 5,000-500,000 g/mol when it is applied to the LC alignment film.

Polyamic acid of the present invention is dissolved in an appropriate solvent to form the LC alignment film, and has excellent solubility in a polar aprotic solvent, such as N-methyl-2-pyrrolidone (NMP), gamma-butyrolactone (GBL), dimethylformamide (DMF), dimethylacetamide (DMAc), and tetrahydrofuran (THF). The excellent solubility is considered to be caused by a joint action of aliphatic cyclic acid dianhydride and the side chain which increases the free volume of polymer. With respect to the recent trend toward large size, high resolution, and high quality of the LCD, the printability of an aligning agent becomes very important, thus the excellent solubility in the solvent positively affects the printability on a substrate when it is applied to the LC alignment film.

In the present invention, polyamic acid is dissolved in the solvent, applied on a substrate, and totally or partially imidized to form the LC alignment film. Imidization efficiency is controlled within a range of 0-100% depending on polymerization conditions. A glass transition temperature ranges from 200 to 350° C. depending on imidization efficiency or the structure.

The alignment film has high light penetration of 90% or higher in a visible ray region and excellent alignment property of liquid crystals, and can be used to easily control the pretilt angle within a range of 1-90°. Furthermore, since it contains functional diamine, refractivity of polymer is reduced and a dielectric constant is reduced.

A better understanding of the present invention may be obtained through the following examples and comparative examples which are set forth to illustrate, but are not to be construed as the limit of the present invention.

PREPARATION EXAMPLE 1

Synthesis of 3,4,5-tri(hexadecyloxy)benzyl alcohol

A round flask equipped with a cooler was prepared, 1 mol component (1) was dissolved in DMF, 3.9 mol potassium carbonate were added thereto, and agitation was conducted. After the solution was sufficiently agitated, 3.3 mol component (2) were added thereto, and the temperature of a reactor was slowly increased to 70° C. After the increase in temperature is completed, a reaction was conducted at that temperature for 24 hours. After the completion of the reaction, the temperature was reduced to room temperature, and the reaction solution was precipitated in sufficiently pure water, filtered, and washed a few times to create a clean product (3). The product thus created was sufficiently dissolved in ethanol, potassium hydroxide was added thereto, and reflux was carried out for 4 hours to produce an acid derivative (4). The reflux reaction was conducted using lithium aluminum hydride for 4 hours to reduce the acid derivative (4), thereby producing 3,4,5-tri(hexadecyloxy)benzyl alcohol (5) to be used as a side chain.

PREPARATION EXAMPLE 2

Synthesis of 16G1-AG-bis(aminophenoxy)triazine

Figure 1:
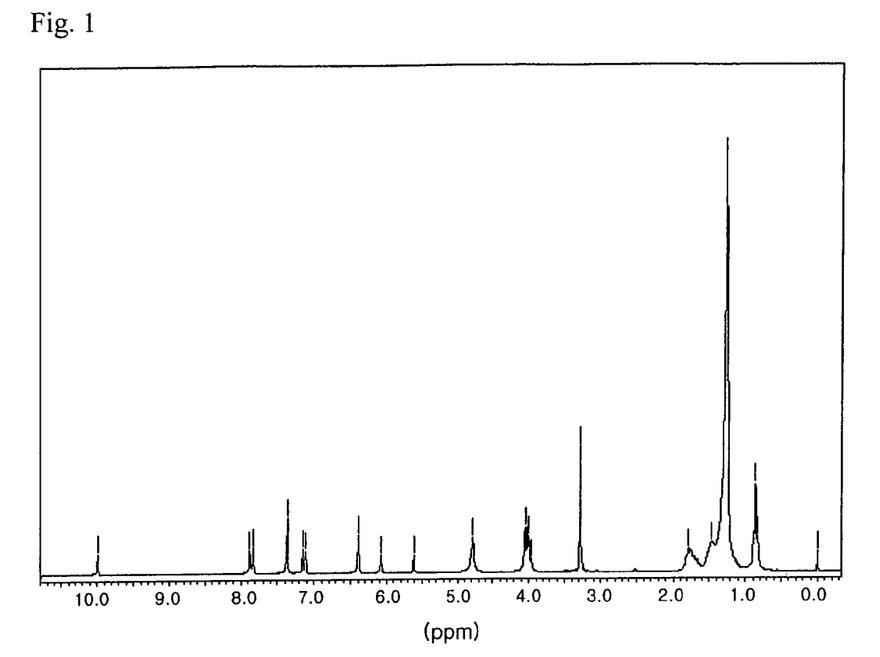
FIG. 1 illustrates H-NMR data of 16G1-AG-bis(aminophenoxy)triazine which is diamine having dendron side chains according to the present invention.
Figure 2:
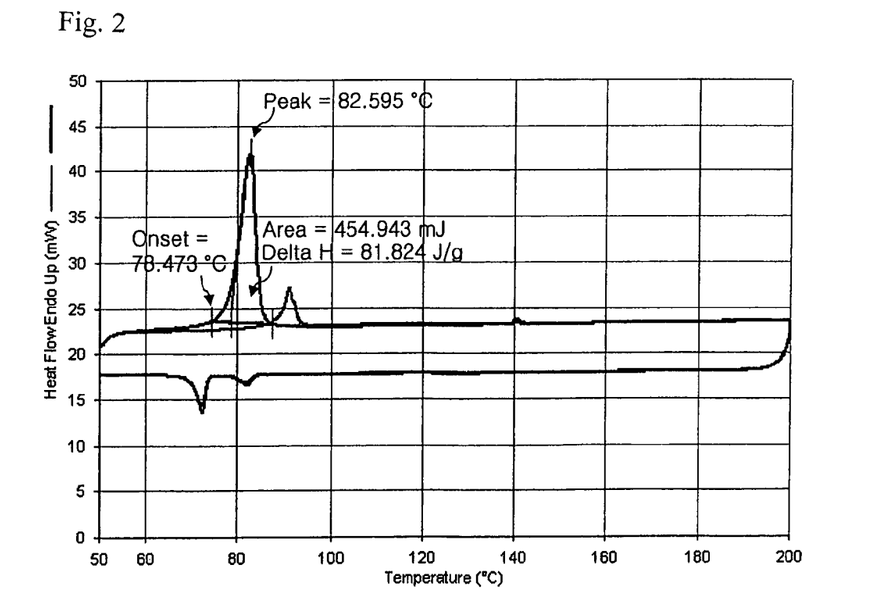
FIG. 2 illustrates the DSC (Differential Scanning Calorimeter) results of 16G1-AG-bis(aminophenoxy)triazine.

-continued 10 mmol reactant produced according to preparation example 1 was dissolved in 100 g of THF, and added to 100 ml of THF solution in which 15 mmol triethylamine (TEA) and 30 mmol cyanuric chloride were dissolved for 30 min. The reaction was conducted at room temperature for 3 hours, and recrystallization was conducted using hexane as a solvent to produce pure 2,4-dichloro-6-tri(hexadecyloxy)benzyloxy-1, 3,5-triazine. 10 mmol 2,4-dichloro-6-tri(hexadecyloxy)benzyloxy-1,3,5-triazine was dissolved in 100 ml of THF, 40 mmol 4-nitrophenol and 30 mmol triethylamine (TEA) were added thereto, and the reaction was conducted at room temperature for 3 hours. After the reaction was completed, the product was precipitated in an excess amount of pure water, and the resulting product was extracted using ether as a solvent and dried with magnesium sulfate to produce white 2,4-dinitrophenoxy-6-tri(hexadecyloxy)benzyloxy-1,3,5-triazine using a column chromatography. 15 g of 2,4-dinitrophenoxy-6-tri(hexadecyloxy)benzyloxy-1,3,5-triazine was dissolved in 300 ml of tetrahydrofuran, 1.4 g of Pd/C was added thereto, and the reaction was conducted at 30° C. for 6 hours in hydrogen at 50 psi. After completion of the reaction, filtration was carried out to remove palladium and reduced pressure distillation was conducted to produce a solid product. The product was recrystallized to produce pure 2,4-diaminophenoxy-6-tri(hexadecyloxy)benzyloxy-1,3,5-triazine (16G1-AG-bis(aminophenoxy)triazine). The final product was a white solid having relatively good storage stability in atmospheric air, whose structure was confirmed using 1H-NMR spectrum and DSC. The results are shown in FIGS. 1 and 2.

EXAMPLE 1

99 mmol 4,4-methylenedianiline, 1 mmol 16G1-AG-bis (aminophenoxy)triazine, and N-methyl-2-pyrrolidone (NMP) were added and dissolved in a four neck flask which was equipped with an agitator, a temperature controller, a nitrogen feeding device, and a cooler while nitrogen flowed therethrough. 50 mmol 5-(2,5-dioxotetrahydrofuran-3-yl)-1, 2,3,4-tetrahydronaphthalene-1,2-dicarboxylic anhydride (DOTDA) in a solid state and 50 mmol pyromellitic dianhydride (PMDA) were added thereto and then vigorously agitated. At this stage, the solid content was 15 wt %, and the reaction was conducted at a temperature less than 25° C. for 24 hours to produce a polyamic acid solution (PAA-1).

In order to observe chemical resistance of an alignment film solution produced through the above-mentioned procedure, after the alignment film solution was applied on an ITO glass having a size of 10 cm×10 cm through a spin coating process in a thickness of 0.1 μm and subjected to a hardening process at 70 and 210° C., the surface of the alignment film, which was subjected to a rubbing process, was sufficiently washed using isopropyl alcohol and pure water and subjected to an assembly process. Liquid crystal was fed thereinto to produce an LCD cell for testing. Voltage of 1-10 V was applied to the cell to operate it, whether stains were formed by a cleaning solvent was observed, and the results are described in the following Table 1.

Furthermore, in order to observe optical and electrical properties, after the alignment film solution was applied on an ITO glass having a size of 3 cm×6 cm through the spin coating process in a thickness of 0.1 μm and subjected to a hardening process at 70 and 210° C., rubbing, assembly, and LC feeding processes were conducted to produce an LCD cell for testing. Voltage of 1 V was applied to the cell to measure a voltage holding ratio (VHR) of the test cell depending on temperature, voltage of −10 V-+10 V was applied thereto to measure a remaining direct current (RDC) of the test cell, and voltage of 5 V was applied thereto to measure a contrast ratio of the test cell. The results are described in the following Table 1.

To measure alignment and a pretilt angle of the liquid crystal due to rubbing, the polyamic acid solution was applied on the ITO glass substrate in a thickness of 0.1 μm and hardened at 210° C.

After the alignment film was formed on the ITO glass substrate, spreading and end-curling properties were observed, both with the naked eye and using an optical microscope, to evaluate the printability of the alignment film. The surface of the alignment film was rubbed using a rubbing device, two substrates were disposed parallel to each other such that rubbing directions of the two substrates are in opposite to each other, and a cell was inserted between the two substrates so as to maintain a cell gap of 50 μm. The liquid crystal was charged in the LC cell produced through the above procedure, alignment was observed using an optical microscope which was orthogonally polarized, a pretilt angle was measured using a crystal rotation method, and the results are described in the following Table 1.

EXAMPLE 2

The procedure of example 1 was repeated to produce a polyamic acid solution (PAA-2) except that 98 mmol 4,4-methylenedianiline and 20 mmol 16G1-AG-bis(aminophenoxy)triazine were used. Furthermore, optical and electrical properties, liquid crystal alignment, pretilt angle, and chemical resistance were observed using the same methods as in example 1, and the results are described in the following Table 1.

EXAMPLE 3

The procedure of example 1 was repeated to produce a polyamic acid solution (PAA-3) except that 95 mmol 4,4-methylenedianiline and 5 mmol 16G1-AG-bis(aminophenoxy)triazine were used. Furthermore, optical and electrical properties, liquid crystal alignment, pretilt angle, and chemical resistance were observed using the same methods as in example 1, and the results are described in the following Table 1.

EXAMPLE 4

The procedure of example 1 was repeated to produce a polyamic acid solution (PAA-4) except that 90 mmol 4,4-methylenedianiline and 10 mmol 16G1-AG-bis(aminophenoxy)triazine were used. Furthermore, optical and electrical properties, liquid crystal alignment, pretilt angle, and chemical resistance were observed using the same methods as in example 1, and the results are described in the following Table 1.

EXAMPLE 5

The procedure of example 1 was repeated to produce a polyamic acid solution (PAA-5) except that 80 mmol 4,4-methylenedianiline and 20 mmol 16G1-AG-bis(aminophenoxy)triazine were used. Furthermore, optical and electrical properties, liquid crystal alignment, pretilt angle, and chemical resistance were observed using the same methods as in example 1, and the results are described in the following Table 1.

EXAMPLE 6

The procedure of example 1 was repeated to produce a polyamic acid solution (PAA-6) except that 60 mmol 4,4-methylenedianiline and 40 mmol 16G1-AG-bis(aminophenoxy)triazine were used. Furthermore, optical and electrical properties, liquid crystal alignment, pretilt angle, and chemical resistance were observed using the same methods as in example 1, and the results are described in the following Table 1.

EXAMPLE 7

The procedure of example 1 was repeated to produce a polyamic acid solution (PAA-7) except that 50 mmol 1,2,3,4-cyclobutanetetracarboxylic dianhydride (CBDA) was used instead of 5-(2,5-dioxotetrahydrofuran-3-yl)-1,2,3,4-tetrahydronaphthalene-1,2-dicarboxylic anhydride (DOTDA). Furthermore, optical and electrical properties, liquid crystal alignment, pretilt angle, and chemical resistance were observed using the same methods as in example 1, and the results are described in the following Table 1.

EXAMPLE 8

The procedure of example 7 was repeated to produce a polyamic acid solution (PAA-8) except that 98 mmol 4,4-methylenedianiline and 2 mmol 16G2-AG-bis(aminophenoxy)triazine were used. Furthermore, optical and electrical properties, liquid crystal alignment, pretilt angle, and chemical resistance were observed using the same methods as in example 1, and the results are described in the following Table 1.

EXAMPLE 9

The procedure of example 7 was repeated to produce a polyamic acid solution (PAA-9) except that 95 mmol 4,4-methylenedianiline and 5 mmol 16G2-AG-bis(aminophenoxy)triazine were used. Furthermore, optical and electrical properties, liquid crystal alignment, pretilt angle, and chemical resistance were observed using the same methods as in example 1, and the results are described in the following Table 1.

EXAMPLE 10

The procedure of example 7 was repeated to produce a polyamic acid solution (PAA-10) except that 90 mmol 4,4-methylenedianiline and 10 mmol 16G2-AG-bis(aminophenoxy)triazine were used. Furthermore, optical and electrical properties, liquid crystal alignment, pretilt angle, and chemical resistance were observed using the same methods as in example 1, and the results are described in the following Table 1.

EXAMPLE 11

The procedure of example 7 was repeated to produce a polyamic acid solution (PAA-11) except that 80 mmol 4,4-methylenedianiline and 20 mmol 16G2-AG-bis(aminophenoxy)triazine were used. Furthermore, optical and electrical properties, liquid crystal alignment, pretilt angle, and chemical resistance were observed using the same methods as in example 1, and the results are described in the following Table 1.

EXAMPLE 12

The procedure of example 7 was repeated to produce a polyamic acid solution (PAA-12) except that 60 mmol 4,4-methylenedianiline and 40 mmol 16G2-AG-bis(aminophenoxy)triazine were used. Furthermore, optical and electrical properties, liquid crystal alignment, pretilt angle, and chemical resistance were observed using the same methods as in example 1, and the results are described in the following Table 1.

EXAMPLE 13

After 53.3 g of polyamic acid solution (PAA-2) produced according to example 4 were dissolved in N-methyl pyrrolidinone (NMP) in an amount of 10 wt %, 0.1 mol pyridine and 0.1 mol acetic anhydride were added thereto, a cyclization reaction was conducted at 80° C. for 2 hours, and the resulting product was precipitated in methanol to produce 49 g of polymer powder having imidization efficiency of 70%. The polymer powder was sufficiently dried in a vacuum and dissolved in N-methylpyrrolidinone (NMP) to produce a polyimide solution (PI-13). Optical and electrical properties, liquid crystal alignment, pretilt angle, and chemical resistance were observed using the same methods as in example 1, and the results are described in the following Table 1.

EXAMPLE 14

The procedure of example 13 was repeated to produce a polyimide solution (PI-14) having imidization efficiency of 98% except that 0.3 mol pyridine and 0.25 mol acetic anhydride were added and a cyclization reaction was conducted at 80° C. for 4 hours. Optical and electrical properties, liquid crystal alignment, pretilt angle, and chemical resistance were observed using the same methods as in example 1, and the results are described in the following Table 1.

COMPARATIVE EXAMPLE 1

The procedure of example 1 was repeated to produce a polyamic acid solution (PAA-13) except that 90 mmol 4,4-methylenedianiline and 10 mmol 2,4-diaminophenoxyoctadecane were used. Furthermore, optical and electrical properties, liquid crystal alignment, pretilt angle, and chemical resistance were observed using the same methods as in example 1, and the results are described in the following Table 1.

COMPARATIVE EXAMPLE 2

The procedure of example 1 was repeated to produce a polyamic acid solution (PAA-14) except that 80 mmol 4,4-methylenedianiline and 20 mmol 2,4-diaminophenoxyhexadecane were used. Furthermore, optical and electrical properties, liquid crystal alignment, pretilt angle, and chemical resistance were observed using the same methods as in example 1, and the results are described in the following Table 1.

COMPARATIVE EXAMPLE 3

The procedure of example 7 was repeated to produce a polyamic acid solution (PAA-15) except that 90 mmol 4,4-methylenedianiline and 10 mmol 2,4-diaminophenoxyoctadecane were used. Furthermore, optical and electrical properties, liquid crystal alignment, pretilt angle, and chemical resistance were observed using the same methods as in example 1, and the results are described in the following Table 1.

COMPARATIVE EXAMPLE 4

The procedure of example 7 was repeated to produce a polyamic acid solution (PAA-16) except that 80 mmol 4,4-methylenedianiline and 20 mmol 2,4-diaminophenoxyhexadecane were used. Furthermore, optical and electrical properties, liquid crystal alignment, pretilt angle, and chemical resistance were observed using the same methods as in example 1, and the results are described in the following Table 1.

TABLE 1

| Sample | Pretilt angle (°) | Printability | Alignment stability | Chemical resistance | Contrast ratio | Molecular weight ($10^4$ g/M) | Remaining DC | Voltage holding ratio (%) Room temp. | 60° C. |
|---|---|---|---|---|---|---|---|---|---|
| Ex. 1 | 4.3 | Good | Good | Good | 385 | 55 | 55 | 98.4 | 93.0 |
| Ex. 2 | 8.2 | Good | Good | Good | 410 | 45 | 70 | 98.7 | 91.5 |
| Ex. 3 | 87.5 | Good | Very Poor | Good | 425 | 39 | 70 | 99.0 | 94.6 |
| Ex. 4 | 89.5 | Good | Good | Good | 420 | 30 | 55 | 98.7 | 97.2 |
| Ex. 5 | 89.8 | Good | Good | Good | 560 | 16 | 90 | 99.0 | 98.3 |
| Ex. 6 | 89.8 | Good | Good | Good | 510 | 12 | 120 | 99.3 | 95.2 |
| Ex. 7 | 3.8 | Good | Good | Good | 455 | 56 | 75 | 97.5 | 98.9 |
| Ex. 8 | 9.1 | Good | Good | Good | 465 | 57 | 120 | 99.4 | 98.5 |
| Ex. 9 | 86.7 | Good | Very Poor | Good | 385 | 40 | 110 | 99.3 | 98.4 |
| Ex. 10 | 89.2 | Good | Very Poor | Good | 520 | 33 | 165 | 99.5 | 97.9 |
| Ex. 11 | 89.9 | Good | Good | Good | 625 | 31 | 225 | 99.5 | 97.2 |
| Ex. 12 | 89.9 | Good | Good | Good | 575 | 12 | 70 | 99.2 | 98.2 |
| Ex. 13 | 89.4 | Medium | Good | Good | 400 | 5 | 380 | 97.2 | 92.8 |
| Ex. 14 | 89.8 | Poor | Good | Good | 410 | 6 | 560 | 98.3 | 91.1 |
| Co. Ex. 1 | 12.5 | Good | Poor | Poor | 285 | 22 | 120 | 98.9 | 92.1 |
| Co. Ex. 2 | 88.9 | Good | Poor | Poor | 520 | 10 | 240 | 98.3 | 91.6 |
| Co. Ex. 3 | 9.3 | Good | Poor | Poor | 315 | 26 | 46 | 99.0 | 89.5 |
| Co. Ex. 4 | 87.6 | Good | Poor | Poor | 480 | 17 | 360 | 99.4 | 89.4 |

An LC alignment film which is produced using a composition for the LC alignment film according to the present invention has excellent alignment, printability, and resistance to a washing process, and is easily controlled so as to have a high pretilt angle. Thus, an LCD using the LC alignment film can have excellent electrical and optical properties.

What is claimed is:
1. A diamine compound having a dendron side chain, which is expressed by the following Formula 1

Formula 1 wherein, A and A' are each a single bond, —CH$_2$O—, OCH$_2$—, —OCO—, or —NHCO—, B is —O— or a single bond, m is an integer from 1 to 3, n is an integer of 2 or 3, G is a single bond (when m is 1), a benzene ring having an equivalence of 3 when m is 2), or a benzene ring having an equivalence of 4 when m is 3), and R is each independently a linear, branched, or cyclic alkyl or fluoroalkyl group having from 1 to 30 carbons.

2. A composition for a liquid crystal alignment film, comprising:
polyamic acid which is produced by copolymerizing the diamine compound according to claim 1, aliphatic cyclic acid dianhydride, aromatic cyclic acid dianhydride, and optionally an aromatic cyclic diamine compound.

3. The composition as set forth in claim 2, wherein content of the polyamic acid is 1-40 wt % and content of a solvent is 60-99 wt %.

4. The composition as set forth in claim 2, wherein the polyamic acid is expressed by the following Formula 4

Formula 4 wherein, X and Y are each independently acid dianhydride and one or more functional groups selected from functional groups expressed by the following Formula 5 or 6, Z includes one or more functional groups selected from functional groups expressed by the following Formula 7, Z' includes one or more functional groups selected from functional groups expressed by the following Formulae 1a and 7, and at least one Z' of polyamic acid monomer expressed by Formula 4 is selected from functional groups expressed by the following Formula 1a

Formula 1a wherein, A and A' are each a single bond, —CH$_2$O—, OCH$_2$—, —OCO—, or —NHCO—, B is —O— or a single bond, m is an integer of 1 to 3, n is an integer of 2 or 3, G is a single bond (when m is 1), a benzene ring having an equivalence of 3 when m is 2), or a benzene ring having an equivalence of 4 when m is 3), and R is each independently a linear, branched, or cyclic alkyl or fluoroalkyl group having 1 to 30 carbons

Formula 5

Formula 6 wherein, $X_1$, $X_2$, $X_3$, and $X_4$ are each independently —H, —CH$_3$, —F, —Br, —Cl, —CN, —OH, or —NO$_2$.

Formula 7

5. The composition as set forth in claim 2, wherein an average molecular weight of the polyamic acid is 5000-500,000 g/mol.

6. The composition as set forth in claim 2, wherein the aromatic cyclic diamine includes one or more selected from a group consisting of p-phenylene diamine (p-PDA), 4,4-methylene dianiline (MDA), 4,4-oxydianiline (ODA), m-bis (aminophenoxy)diphenylsulfone (m-BAPS), p-bis(aminophenoxy)diphenylsulfone (p-BAPS), 2,2-bis (aminophenoxy)phenylpropane (BAPP), and 2,2-bis (aminophenoxy)phenylhexafluoropropane (HF-BAPP), the aromatic cyclic acid dianhydride includes one or more selected from a group consisting of pyromellitic dianhydride (PMDA), biphthalic dianhydride (BPDA), oxydiphthalic dianhydride (ODPA), benzophenonetetracarboxylic dianhydride (BTDA), and hexafluoroisopropylidene diphthalic dianhydride (6-FDA), and the aliphatic cyclic acid dianhydride includes one or more selected from a group consisting of 5-(2,5-dioxotetrahydrofuryl)-3-methyl-3-cyclohexene-1,2-dicarboxylic anhydride (DOCDA), bicycloocten-2,3,5,6-tetracarboxylic dianhydride (BODA), 1,2,3,4-cyclobutane-tetracarboxylic dianhydride (CBDA), 1,2,3,4-cyclopentanetetracarboxylic dianhydride (CPDA), and 1,2,4,5-cyclohexanetetracarboxylic dianhydride (CHDA).

7. The composition as set forth in claim 2, wherein the polyamic acid contains 0.1-100 mol % diamine expressed by Formula 1 and 0-99.9 mol % aromatic cyclic diamine based on total diamine, and 10-80 mol % aromatic cyclic acid dianhydride and 20-90 mol % aliphatic cyclic acid dianhydride based on total acid dianhydride components.

8. The composition as set forth in claim 2, wherein a solvent includes one or more selected from a group consisting of N-methyl-2-pyrrolidone (NMP), gamma-butyrolactone (GBL), dimethylformamide (DMF), dimethylacetamide (DMAc), and tetrahydrofuran (THF).

9. A liquid crystal alignment film for twisted nematic (TN) or vertical alignment (VA) application, which is produced by applying the composition for the liquid crystal alignment film according to claim 2 and totally or partially imidizing the applied composition.

10. A liquid crystal display device comprising the liquid crystal alignment film according to claim 9.

* * * * *